Nov. 2, 1954 A. O. KRIER 2,693,069
BEET HARVESTING AND TOPPING DEVICE
Filed Nov. 20, 1951 2 Sheets-Sheet 1
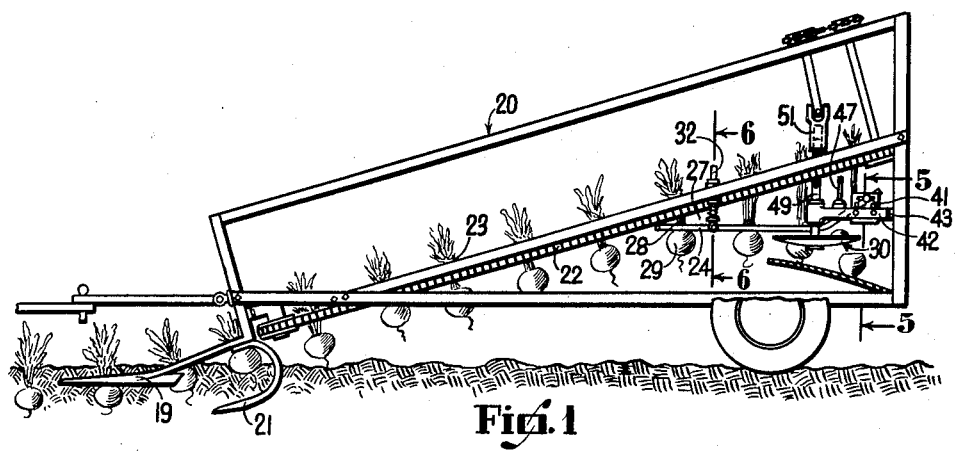
INVENTOR.
Alexander O. Krier
BY
his Attorney Nov. 2, 1954  A. O. KRIER  2,693,069
BEET HARVESTING AND TOPPING DEVICE
Filed Nov. 20, 1951  2 Sheets-Sheet 2

INVENTOR.
Alexander O. Krier.
BY
*his Attorney*

United States Patent Office 2,693,069
Patented Nov. 2, 1954

2,693,069

BEET HARVESTING AND TOPPING DEVICE

Alexander Oscar Krier, Columbus, Ohio, assignor to The Scott-Viner Company, Columbus, Ohio, a corporation of Ohio Application November 20, 1951, Serial No. 257,283

4 Claims. (Cl. 55—108)

The present invention relates to a beet harvester of the type that tops beets after they have been removed from the soil, and particularly to a beet harvester utilizing spaced gauging rods to position beets relative to cutting knives for proper topping.

The gauging rods of the present invention are mounted on a beet harvester below a conveyor means carrying beets suspended by their tops upwardly from the soil. Two such gauging rods are utilized to engage the suspended beet on its crown on each side of the beet green, or top as it will be called herein. Below the gauging bars, topping knives are provided for severing the beet body from the top. The novelty of the present apparatus lies in the mounting of the gauging rods so as to yieldingly receive beets carried thereto in a steady flow without plugging of the mechanism.

A further object of the present invention is to provide for mounting the gauging rods and topping knives in a novel way so that they can be vertically adjustable to accommodate beets having a great variance in size and top development. Such great variance is encountered from year to year, or from field to field, in contrast to the relative slight variance in beet size encountered in the steady flow harvesting of a row of beets in a given field.

It is desirable to utilize spaced gauging rods in a beet harvester for reasons of simplicity and economy, and applicant's invention for yieldingly and adjustably mounting these gauging rods has resulted in a simple, efficient beet gauging apparatus that eliminates the use of complicated mechanisms of moving parts subjected to complex motions.

Further definitions, results and advantages of the present invention will be apparent from the following description, reference being had to the accompanying drawings, wherein one embodiment of the invention is illustrated.

In the drawings:

Fig. 1 is a schematic view of the main parts of a beet harvester constructed in accordance with the present invention;

Fig. 2 is a side elevational view of the gauging rods utilized in the present invention;

Fig. 3 is a top elevational view of the gauging rods utilized in the present invention;

Figure 5:
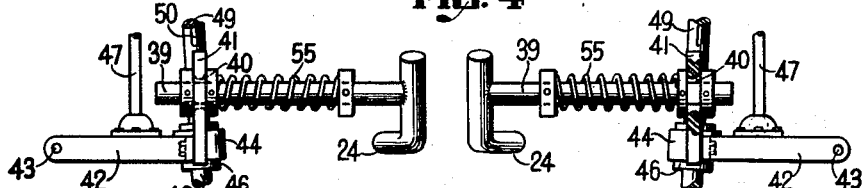
Figure 6:
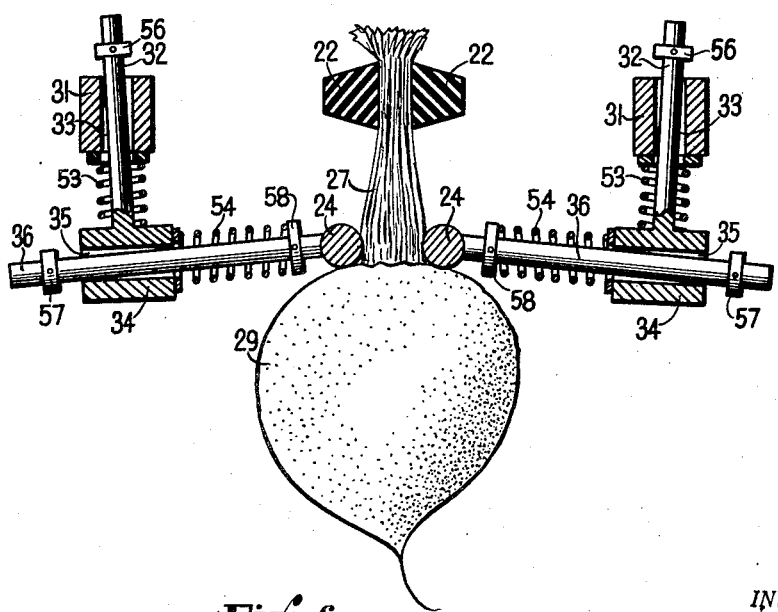

Fig. 5 is a vertical sectional view taken essentially along line 5—5 on Fig. 1, showing the rear mountings for the gauging rods utilized in the present invention; and Fig. 6 is a vertical sectional view taken essentially along line 6—6 on Fig. 1, showing the front mountings for the gauging rods utilized in the present invention, and showing the gauging rods rocked upward by force exerted by a contacting beet crown.

Referring to Fig. 1 of the drawing, a beet harvester is schematically shown having a frame indicated generally at 20. A plow 21 is mounted on the forward end of the frame for loosening the beets from the soil. A conveyor 22 is arranged to grasp and to clasp along its length the beet tops as seen at 23 and to convey the beets in a steady flow, upwardly towards a pair of gauging rods indicated generally at 24. A pair of lifter shoes 19 in the form of horizontally extending rods are positioned forward on the frame to guide the beet tops to the conveyor 22.

Referring to Fig. 3, it is seen that gauging rods 24 have forward ends outwardly flared at 25. This outward flare is great enough to allow the entry of the largest beet tops. The space between the rods is lessened at 26 so that the gauging rods 24 will contact the sides of the beet tops to hold the beets centrally aligned. The vertical distance between the gauging rods 24 and the conveyor 22 becomes progressively greater towards the rear, and conveyor 22 yieldingly grasps the beet tops when the beets arrive at the upper portion of the conveyor indicated at 27. When a beet, such as the one shown at 29, is engaged by the gauging rods 24, it is drawn vertically downward relative to the conveyor, but the beet top is yieldingly clasped so that tension is retained in beet top 28 as beet 29 is conveyed rearwardly toward a pair of topping knives 30.

By yieldingly retaining tension in beet tops at 27 along conveyor 22, the beets are constantly urged upwardly against gauging rods 24 to position them for proper topping as they proceed along the gauging rods 24.

Referring to Fig. 6, the apparatus for yieldingly mounting the forward ends of gauging rods 24 is clearly shown. Reference will be made to one gauging rod for convenience of description. Frame 20 fixedly carries a shaft guide 31 in which a shaft 32 is slidably carried.

A second shaft guide 34 is horizontally disposed on the lower end of shaft 32 and is provided with a hole 35 for receiving a horizontal shaft 36. Gauging rod 24 is fastened to the inwardly extending end of the latter shaft. The springs 53 and 54 are arranged on shafts 32 and 36 respectively, so that the shafts will be slidable in their respective guides, thereby providing yielding mountings for gauging rod 24. The springs 53 and 54 are located on the shafts to constantly urge the gauging rod 24 inwardly and downwardly as shown in Fig. 6.

The guides 31 and 34 are provided with holes 33 and 35 of greater diameter than the shafts 32 and 36 respectively carried therein. The guide holes are of such a greater diameter than the shafts that the latter would be loosely carried therein, were it not for the constantly urging springs 53 and 54 imparting rigidity to the assembly. Such clearance between the shafts and the housings imparts additional flexibility to the gauging rods 24 in that they can rock upward to the position shown in Fig. 6 when rods 24 engage the crown of a beet that is too large to be accommodated by the first mentioned flexibility imparted to the gauging rods 24 by the sliding action of shafts 32 and 36 in housings 31 and 34 as previously described. Hence it is seen that gauging rods 24 are made flexibly moveable by the sliding and rocking actions of shafts 32 and 36 which are mounted yieldingly responsive to forces imparted to gauging rods 24 by the crowns of the upwardly urged beets being positioned thereby.

Referring to Fig. 5 and particularly to the mounting of one gauging rod, it is seen that the rearward end of gauging rod 24 is mounted to yield horizontally outwardly in opposition to the normally inward pressure of a spring 55 carried on a shaft 39. The outer end of shaft 39 passes thru a slot 40 in a bracket 41, for mounting the shaft to the bracket. Slot 40 is provided to permit longitudinal adjustment of the topping knives 30 relative to the gauging rods 24. By moving the topping knives forwardly or backwardly, relative to the gauging rods, the position along the gauging rod at which the beet is topped can be varied, without effecting the vertical distances between the conveyor, the topping knives, and the gauging rods. Here again, as is shown for the forward mountings in Fig. 6, clearance is provided between the shaft 39 and the slot 40 for the rear mounting of rod 24 to allow shaft 39 and the forward end of rod 24 carried thereby to rock upward in response to force applied to rod 24 by unusually large beet crowns.

The bracket 41 is fastened by bolts 41a in slots 41b to pivoted beam 42 which is in turn pivotally mounted to the frame side at 43. Slots 41b are provided to allow vertical adjustment of bracket 41 relative to beam 42. Pivoted beam 42 also carries a knife shaft bearings 44 near the inner ends thereof. Thus it is seen that a gauging rod 24 and a knife shaft bearing 44 are both mounted to the inner end of a pivotal beam 42 and therefore, they are both effectively mounted to pivot about the same axis at 43.

A knife disk 45 is mounted on the knife shaft 49 to be driven by the rotation of the shaft. Knife disk 45 and shaft 49 are retained from sliding in bearing 44 by a pair of collars 46, so that knife 45 is pivotally carried about point 43 along with the gauging rod 24.

To impart vertical adjustment to the gauging rod and the knife, a crank 47 is carried by frame 20, and provided with external threads to engage cooperating internal threads in the frame, as shown generally at 48. The crank extends downward to engage the pivoted beam 42 so that rotation of crank 47 will impart vertical adjustment to the gauging rod 24 and the knife 45, both effectively carried by pivoted beam 42 so as to move essentially vertically when the crank 47 is actuated.

The knife shaft 49 is provided with a spline section 50 and a universal joint 51 to provide a flexible drive between a power take-off mounted to the frame and the topping knives that are movably adjustable relative to the frame.

Figure 4:
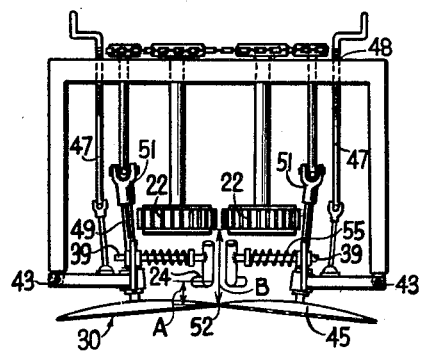
Fig. 4 is a partial rear elevational view of a beet harvester showing the location of the topping knives relative to the gauging rods.

Referring again to Fig. 4 it is seen that the distance between the conveyor 22 and a topping knife edge 52 is designated B. Also the distance between the gauging rod 24 and the topping knife edge 52 is designated A. When crank 47 is actuated to simultaneously raise the gauging rod and the knife, both the vertical distances A and B are shortened. Such a shortening is desirable to adjust the topping mechanism to accommodate smaller beets. When dimension A is shortened, less of the beet crown will be severed from the beets along with the tops, thereby eliminating the wasting of usable portions of the beet. At the same time, it is desirable to shorten dimension B so that the shorter length of the tops on small beets can span the distance from the conveyor to the gauging rods.

In order to decrease the dimension A, between the topping knife edge 52 and the conveyor, it will be understood that actuation of crank 47 will raise the rear portion of the gauging rod, at 39, and the knife edge 52, at approximately the same rate due to the common pivot 43. The gauging rod at its front mounting, however, remains fixed relative to the conveyor since it is secured directly to the frame at 32. Hence any intermediate point on the gauging rod will be raised, relative to the conveyor, a distance less than the amount the rear end of gauging rod will be raised. For example, the point along the gauging rods length at which a sugar beet engages the knives will always be considerably forward of the rear end of the gauging rod. Hence, such point of knife contact is raised less, upon actuation of crank 47, than knife edge 52 such that dimension A is decreased at the time dimension B is decreased, and by a single adjusting crank.

In the embodiment just described, the dimensions A and B are simultaneously shortened or lengthened to accommodate various sized beets by the actuation of a single adjusting crank.

In Fig. 6, the collars 56, 57 and 58 are slidably mounted on shafts 32 and 36 and provided with set screws so that the collars can be fastened in different positions along the shaft. This arrangement provides vertical and horizontal adjustments for gauging rod 24, so that the rod may be positioned for properly guiding beets of various sizes. Such an adjustment is usually not made during a harvesting operation, but may be made when the machine is not operating, to accommodate large variations in beet size as is sometimes encountered from year to year or from locality to locality.

In operation, the beet harvester is pulled along a row of beets by a tractor. The plow shown at 21 in Fig. 1 dislodges the beets from the soil and the lifter shoes 19 cooperate with conveyor 22 to carry the beets upwardly and rearwardly towards the gauging rods 24 that function as described herein to position the beets for proper topping by the topping knives 30. In the event that a variation in beet size is encountered in different fields, or at an end of a particular field where the moisture supply and soil conditions have produced such a variation, the operator need merely actuate crank 47 to adjust the positions of the gauging rods 24 and the topping knives 30 relative to the conveyor 22. After the beet bodies are severed from the tops, they are free to fall into a hopper, not shown. The severed beet tops are ejected from the conveyor at its upper end, and the tops may be discarded in the field or collected in a hopper, which ever is desired.

While the form of embodiment of the present invention as herein disclosed constitutes a preferred form, it is to be understood that other forms might be adopted, all coming within the scope of the claims which follow.

I claim:

1. In a beet harvester of the type wherein a wheeled frame is provided with a conveyor for lifting beets from the soil, improved beet topping mechanism comprising two members laterally spaced, one from the other, beneath the conveyor, each of said members being pivotally mounted to a respective side of the frame; two laterally spaced parallelly disposed beet positioning guides each having a front portion attached to the frame and a rear portion attached to one of said members; beet top severing means disposed beneath the guides and carried by said members, and means for rotating said members about their pivotal mountings for simultaneously adjusting the guides and the severing means relative to the conveyor and relative to each other.

2. Improved beet topping mechanism as set forth in claim 1 wherein the beet positioning guides are mounted horizontally yieldable relative to the frame and the pivotally mounted members.

3. Improved beet topping mechanism as set forth in claim 1 wherein the beet positioning guides are mounted rockable relative to the frame and the pivotally mounted members.

4. Improved beet topping mechanism as set forth in claim 1 wherein the beet positioning guides are mounted horizontally yieldable and rockable relative to the frame and the pivotally mounted members.

References Cited in the file of this patent

UNITED STATES PATENTS

| Number | Name | Date |
|---|---|---|
| 2,294,348 | Kolstad | Aug. 25, 1942 |
| 2,589,361 | Floeter et al. | Mar. 18, 1952 |